March 19, 1968 R. G. RUSSELL ET AL 3,374,074
METHOD FOR PRODUCTION OF MINERAL FIBERS
Filed April 25, 1967 3 Sheets-Sheet 1

INVENTORS
ROBERT G. RUSSELL,
BY JOHN H. WILLIS &
WILLIAM C. SHAFER

ATTORNEYS

March 19, 1968 R. G. RUSSELL ET AL 3,374,074
METHOD FOR PRODUCTION OF MINERAL FIBERS
Filed April 25, 1967 3 Sheets-Sheet 2

INVENTORS
ROBERT G. RUSSELL,
BY JOHN H. WILLIS &
WILLIAM C. SHAFER

ATTORNEYS

March 19, 1968   R. G. RUSSELL ETAL   3,374,074
METHOD FOR PRODUCTION OF MINERAL FIBERS
Filed April 25, 1967   3 Sheets-Sheet 3

ROBERT G. RUSSELL,
JOHN H. WILLIS &
WILLIAM C. SHAFER
INVENTORS

BY Staelin & Overman
ATTORNEYS

United States Patent Office 3,374,074
Patented Mar. 19, 1968

3,374,074
METHOD FOR PRODUCTION OF
MINERAL FIBERS
Robert G. Russell, Granville, Ohio, John H. Willis, Anderson, S.C., and William C. Shafer, Vestal, N.Y., assignors to Owens-Corning Fiberglas Corporation, a corporation of Delaware
Continuation-in-part of application Ser. No. 214,247, Aug. 2, 1962. This application Apr. 25, 1967, Ser. No. 633,604
5 Claims. (Cl. 65—2)

ABSTRACT OF THE DISCLOSURE

The invention embraces a method of control of an air cooling system for two groups of glass streams flowing from groups of orifices of a stream feeder involving the delivery of air from groups of porous shield members, the feeder being utilized as a resistance thermometer wherein the two halves or sections of the feeder floor are utilized as two resistors in a bridge circuit for automatically and selectively regulating the amount of air delivered from each group of porous shield members whereby more stable thermal balance is maintained between the groups of glass streams.

---

This application is a continuation-in-part of our co-pending application Ser. No. 214,247, filed Aug. 2, 1962, now abandoned.

This invention relates to method of and apparatus for producing fibers from heat-softenable mineral materials such as glass and more especially to a method and apparatus involving automatic thermal control of streams of glass or other fiber forming material flowing from a feeder or bushing which are attenuated to fibers or continuous filaments.

It has been a practice in the production of continuous glass fibers or filaments to flow streams of molten glass from orifices or outlets in a floor or wall of an electrically heated bushing or feeder associated with a forehearth or chamber containing the material in molten condition or a chamber in which the material is reduced to a molten condition. The orifices are usually formed in projecting tips or nipples depending from the feeder or bushing and upon emission to the atmosphere of each stream of glass, by reason of the viscosity and surface tension forms a cone-like body of the glass from which cone a fiber or continuous filament is attenuated.

The cohesive forces which enable the attenuation of the glass to fiber are closely related to the temperature and hence viscosity of the glass. As the temperature of the molten glass increases, the viscosity of the glass in the cone or stream is lowered and if the temperature is decreased, the viscosity is likewise increased offering higher resistance to attenuation. Thus, the viscosity of the glass or other mineral material is a major factor determining stability in the fiber-forming cone. A range of viscosities therefore exists within which satisfactory fiberization or attenuation of the glass can be attained but above and below which attenuation is not commercially satisfactory.

It is therefore highly desirable to satisfactory attenuation that the viscosity of the glass within the bushing or feeder, particularly at the region of the orifices, be low or the glass in a liquidus condition in order to facilitate flow of uniform streams of the glass and, at the region of the cones, to dissipate or convey away heat from the glass to thereby increase the viscosity so that the filaments or fibers may be satisfactorily and efficiently attenuated from the streams.

Apparatus has been employed, such as that shown in Patent 2,908,036, issued Oct. 13, 1959, in which water-cooled shield members are disposed immediately adjacent the fiber-forming cones of glass but in non-contacting relation with the feeder or the projections or tips to absorb heat from the cones by radiation absorption and to subdivide the total number of tips or projections and their respective cones into smaller groups.

The use of such water-cooled shield members or fins make it possible to extend the viscosity range to facilitate the attenuation of the glass heated to a higher temperature than could otherwise be satisfactorily attenuated from glass streams in an unshielded fiber-forming zone and facilitates the production of fibers or continuous filaments of more uniform size. There is a tendency for the volatile materials from the molten glass to be deposited on the shield member surfaces necessitating periodic cleaning in order to again render the shield members effective.

Recently developments have been made utilizing shield members or fins of porous character, the shields being connected with a source of air under pressure whereby air is passed through the porous material of the shields, the air being effective both to provide the cooling for the heat absorption desired and at the same time being effective to clean the shield members by conveying away particles or volatiles which might otherwise tend to collect upon the surfaces.

The passage of air through the shield members adjacent the cones of glass is efficient in effecting heat absorption from the cones by convection and in addition radiation absorption is effected by the surface of the shields. In the air shield arrangement control of the delivery of air has been effected by manual means and hence there have been variations in the cooling of the cones and hence variations in the size and character of the continuous filaments attenuated from the streams.

It is well-known that various regions in an electrically heated feeder or bushing may be at varying temperatures and that such temperatures are constantly changing and these temperature variations cause irregular throughput of individual streams. In the use of double bushings or feeders viz. feeders adapted to provide two groups of streams for forming two strands of filaments, substantial differences in the throughput of the two halves or tip sections may occur. Once a hot region or spot develops, the electrical resistance increases in such area. This condition accelerates throughput in the hot area and tends to promote flow of hotter glass to an already overheated area. These conditions result in substantial yardage variations from a double feeder and manual controls have been inadequate to attain stabilized throughput from a double feeder or bushing.

The invention embraces a method of control of the air cooling system in a manner whereby more stable thermal balance is maintained between the groups of streams of glass flowing from a bushing or feeder through automatic regulation of the air or other gas delivered from porous shield members.

An object of the invention resides in a method especially usable with a double bushing, that is, a bushing having two groups of orifices delivering streams for attenuation into continuous filaments forming duel strands through the use of the feeder as a resistance thermometer wherein the two halves or sections of the floor or wall of the feeder provided with the groups of orifices are utilized as two resistors in a bridge circuit for automatically and selectively controlling or regulating the amount of air delivered from each group of porous screen shields.

Another object of the invention resides in the provision of a method wherein a summation of the average bushing temperature is utilized for automatically regulating the current supplied to the bushing for maintaining the glass at the desired temperature.

Another object of the invention is the provision of an apparatus for controlling the characteristics of groups of streams of molten mineral material flowing through orifices through the use of air cooling arrangements adjacent the groups of streams oriented or associated with a resistance bridge connected with a controller responsive to any imbalance in voltage as a result of temperature imbalance between sections of the feeder for automatically controlling the air cooling for each group of streams.

Another object of the invention resides in a central arrangement associated with a feeder or bushing adapted to flow streams of heat-softened glass or other mineral material involving the use of porous air fins or shields through which a controlled rate of air flow is automatically maintained whereby a cooling or temperature reduction of the cone regions of the glass streams is established by convection transfer of heat to the moving air and by radiation absorption effected by the surfaces of the porous shields or fins whereby the throughput of the glass is maintained substantially constant.

Another object of the invention resides in an automatic control of the delivery of air or other gas through porous shields or fins adjacent glass streams flowing from a feeder in a manner whereby the temperature and hence viscosity of the glass is uniformly stabilized in order to promote the formation of fibers or continuous filaments of uniform dimension.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

While the control arrangement of the invention has particular utility for stabilizing streams of heat-softened glass delivered from a feeder from which continuous filaments or fibers are formed, it is to be understood that the control arrangement may be utilized in conjunction with process or apparatus involving streams of other heat-softenable material or wherever the method and control arrangement may be found to have utility.

Figures 1, 2:
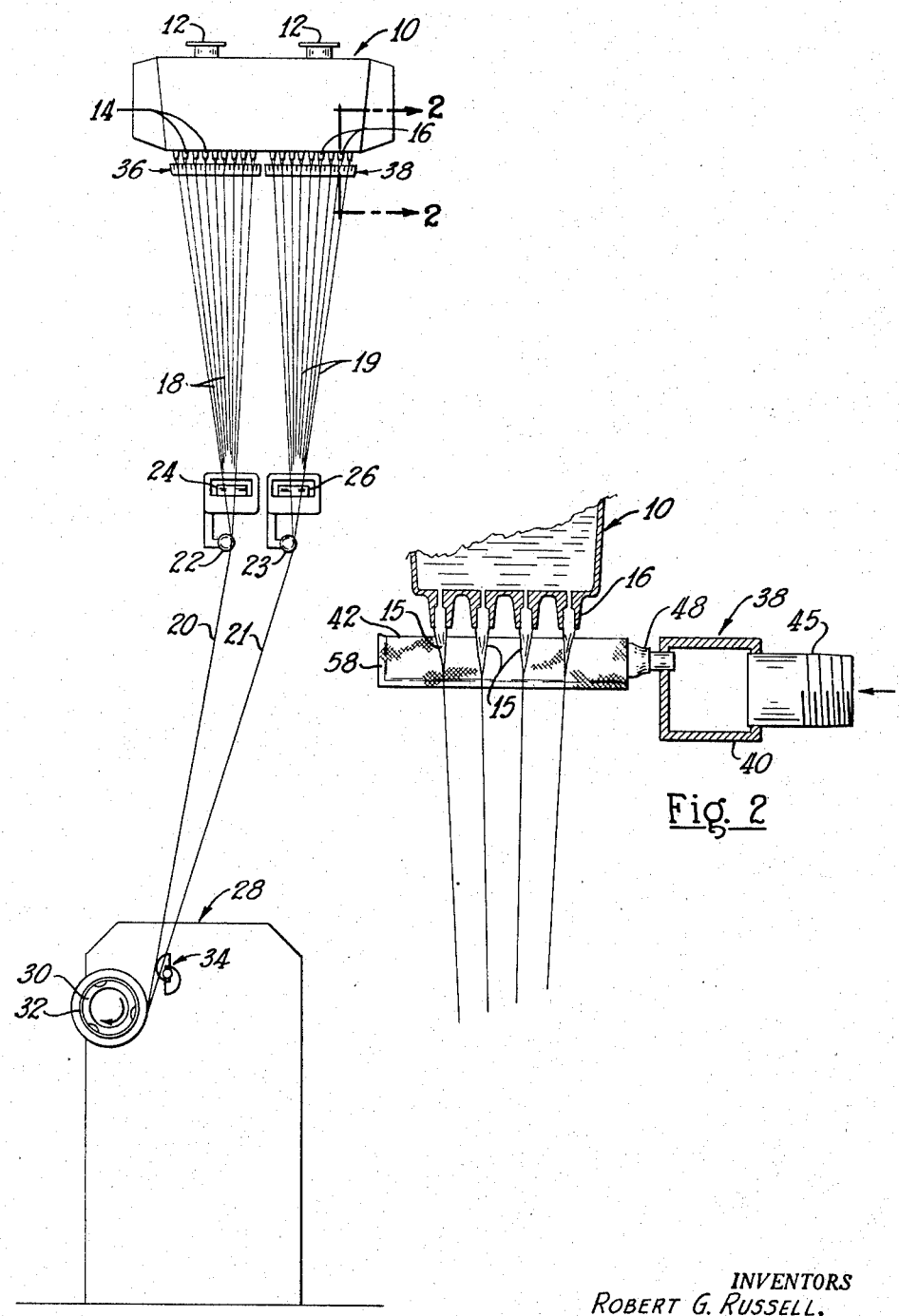
FIGURE 1 is an elevational view illustrating a general layout of apparatus including the shielding and gas delivering components employed in the production of continuous glass fibers or filaments.
FIGURE 2 is an enlarged fragmentary sectional view taken substantially on the line 2—2 of FIGURE 1.

Referring to the drawings in detail, FIGURE 1 illustrates a filament or fiber-forming apparatus including a feeder or bushing 10 adapted to contain heat-softened or molten glass or other filament-forming material and is preferably adapted to receive a supply of heat-softened glass from a forehearth or other melting facility (not shown) or the material may be reduced to molten condition in the feeder. The feeder or bushing 10 is provided with entrance zones or tubular means 12 for the reception of heat-softened glass from a forehearth or melting facility. The floor or lower wall of the feeder or bushing 10 is fashioned with two groups of tips or projections 14 and 16, each tip being formed with an orifice.

A plurality of streams of glass is emitted from each group of orifices for attenuation into two groups of filaments 18 and 19 which are gathered into strands 20 and 21.

The bushing arrangement illustrated in FIGURE 1 is referred to as a double bushing in that it is provided with two groups of projections whereby groups of streams are flowed therefrom. The fibers or continuous filaments formed from the two groups of streams are gathered into the respective strands 20 and 21 by gathering members or guides 22 and 23.

A coating material or sizing fluid is applied to each group of filaments 18 and 19 by means of applicators 24 and 26, which are preferably of the roll type, adapted to apply sizing to each filament above the region of convergence of the filaments at the gathering members or guides 22 and 23. The strands 20 and 21, formed of the respective groups of filaments, are packaged on a winding apparatus 28 which is inclusive of a mandrel 30 upon which two collecting tubes 32 are supported in end-to-end relation, one strand being wound on each tube.

The collet or mandrel 30 is rotated to effect collection of the strands of continuous filaments and attenuates the streams to fine continuous filaments. The strands are traversed lengthwise of the collecting tubes by a suitable traversing means such as a spiral wire traverse 34, one of which is illustrated in FIGURE 1. The winding of the strands at comparatively high speed upon the rotating tubes provides the force of attenuation which develops tension in each fiber or filament to withdraw the same from a glass stream flowing from the feeder.

Figures 3, 4:
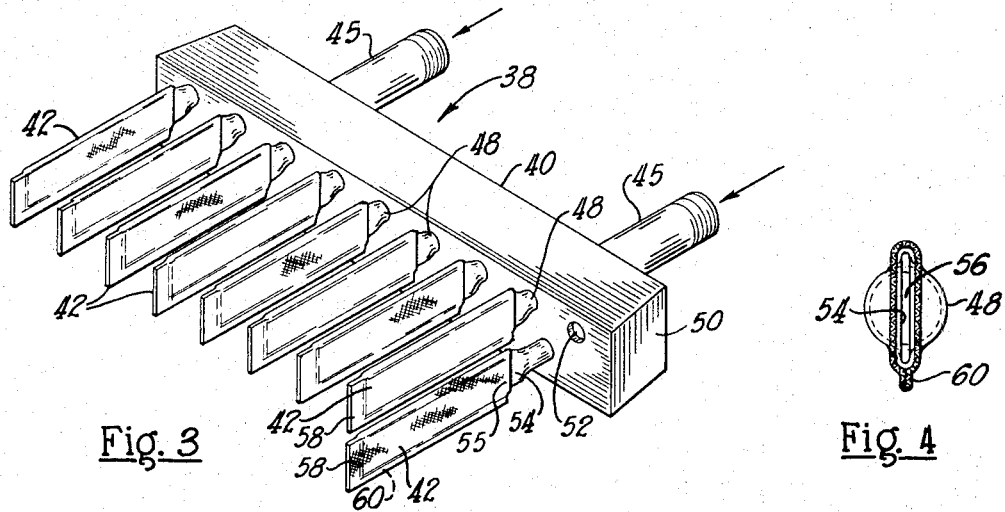
FIGURE 3 is a perspective view of a section of a shield structure or arrangement for delivering air or other gas into the zone of a group of streams of glass.
FIGURE 4 is a transverse sectional view through one of the shield and gas delivery components illustrated in FIGURE 3.

Disposed beneath and in juxtaposed relation to the feeder or bushing 10 are two shield sections or heat transfer components designated 36 and 38, one of which is illustrated in detail in FIGURE 3. Each section is inclusive of a header or manifold 40 to which is secured a plurality of members 42 in the form of hollow, pervious walled blade-like fins, each extending across the bottom of the feeder between pairs of feeder tips 14 and 16 adjacent the respective sections 36 and 38. Each adjacent pair of such porous or previous walled fin members 42 may have one or two rows of the orificed tips or projections therebetween.

The orientation of the porous fins 42 transverse and beneath the feeder is illustrated in FIGURE 2 and the cones of glass 15 providing the streams are thus divided or oriented into crosswise pairs of rows. The porous fins 42 extend transversely from the longitudinal hollow manifolds or headers 36 and 38 which are disposed laterally from the feeder 10, as shown in FIGURE 2. Fluid such as air or other gas is supplied to the headers or manifolds by way of conduits 44 and 45, there being two conduits in spaced relation for each header disposed in the manner illustrated in FIGURE 3.

Through an arrangement hereinafter described, air or other gas under pressure is delivered to the manifolds thence through each of the porous or pervious walled blade-like shield members or fins 42 throughout substantially the full length of each fin and within the fiber-forming zone.

Each fin is joined with a header or manifold by means of a tubular fitting 48 so that air introduced through each fitting 48 flows through the hollow interior portion of a fin 42 and passes through the porous surface of the fins directly into the region of the cones 15 of glass at the fiber or filament forming zone.

Each section comprising a manifold and a group of the fins 42 is adapted to control the adjacent or ambient temperature environment in the region of a plurality of streams. As shown in FIGURE 2, the height of the fins 42 is preferably such that in an operating position the upper edge of each fin is adjacent or slightly below the termini of the adjacent feeder tips while its bottom edge is adjacent or preferably slightly below the apex of the cones 15 of glass emitted from the orifices in the tips 14 and 16. The height of the shield to provide full shielding of the cones in most instances may be in the order of ⅜ of an inch but may vary depending upon the temperature at which the molten glass is maintained.

FIGURES 3 and 4 illustrate the structural features of the components of each of the air shield units showing the method of assembling the porous fins to the header member or manifold 40. Each manifold is of hollow or tubular construction with imperforate end walls 50 and a series of apertures 52 formed in a wall of the manifold adjacent the feeder. Each fin 42 is provided with a fitting 48 extending into an opening 52 and preferably welded to the manifold.

The fittings or couplings 48 are provided with flattened portions 54 which are dimensioned for a snug fit with neck portions 55 on the porous fin members 42. The neck portions 54 are generally rectangular, as shown in FIGURE 4, and the tubular channel in each fitting 48 configurated at the region of its connection with the fin to form an elongated slot 56 through which air is introduced into the hollow porous or foraminous fin. The fins 42 may be assembled with the manifold constructions in varying angular directions to accommodate the angularities of the filaments moving in converging paths away from the feeder 10.

The fins or shields 42 may be made of commercially available woven stainless steel tubular material of circular cross-section. The steel mesh may be cut to desired lengths, and the rectangular configuration imparted thereto by partially flattening the fin to an extent retaining a hollow interior as shown in FIGURE 4. The outer or distal end region of each fin is closed by completely flattening the end portion as at 58 and the contiguous wall regions welded, if desired.

It is desirable for most satisfactory operation that the pores or openings of the mesh be extremely fine in the order of 1,400 apertures or openings per inch or more. Each fin may be wrapped about a mandrel to a cross-sectional shape indicated in FIGURE 4 and the plies brought together as at 60 and welded lengthwise of the fin. As the fins are of fine mesh or highly porous material, it is imperative that the air supplied thereto be filtered so as to remove substantially all foreign particles, oil and moisture.

As the air filters form no part of the present invention, they have not been illustrated. While compressed air or other gas under pressure is supplied to the fins from a supply line having a pressure of the order of twenty-five pounds or more per square inch, it is preferable to reduce the pressure to that which will support a column of water about twelve inches in height delivered at the fin structures.

The air emitted from the porous shield members is biased downwardly by reason of the presence of the feeder 10 and in the direction of movement of the cones and causes a convection transfer of heat from the cones to the air or other gas emitted from the fins. At the region of emission of the flowable glass from the orificed tips, the glass or forming cones 15 have their greatest volume and highest temperature, but as the glass of the cone moves away from the feeder, the cone dimension and temperature is considerably reduced and the viscosity of the streams increased.

Removal of heat by radiation absorption from the cones of glass 15 is most effective at the zone of emission of air from the fins, while transfer of heat by convection is a more effective medium for heat dissipation or removal in the region or environment of the apices of the forming cones where the glass is at a lower temperature. The flow velocity of glass in each cone is gradually increased from the point of emission from the orificed projections to the apices of the cones being attenuated into fibers or continuous filaments.

The air continuously delivered from the fins 42 tends to accumulate in the direction of movement of the cones throughout their entire length to the region of their formation into fibers or filaments. Hence, proportionately more air flows past the tips of the cones 15 and thereby increases convection removal or transfer of heat from the glass and is more effective than the radiation absorption of heat by the metal of the fins. It is preferable to supply air from the fins to the fiber-forming zone or controlled temperature environment in a sufficient quantity as to render negligible the induced air flow over the tops of the shield members or fins 42.

The control of the air flow arrangement facilitates increased control over the diameter of the filaments or fibers and by exercising control over the air flow through each of the control sections 36 and 38, the fibers or filaments in each group may be maintained substantially uniform. This is accomplished by utilizing the entire tip section or floor region of the feeder or bushing as a resistance thermometer, the two halves of the tip section being utilized as two resistors of a bridge circuit or balanced resistance system.

The output of the bridge circuit is correlated with a controller to automatically modify, regulate or proportion the flow rate of air or other gas supplied to the porous fin arrangement. Circuit means is also provided for regulating the flow of electric energy to the feeder or bushing to thereby control the temperature thereof.

Figure 5:
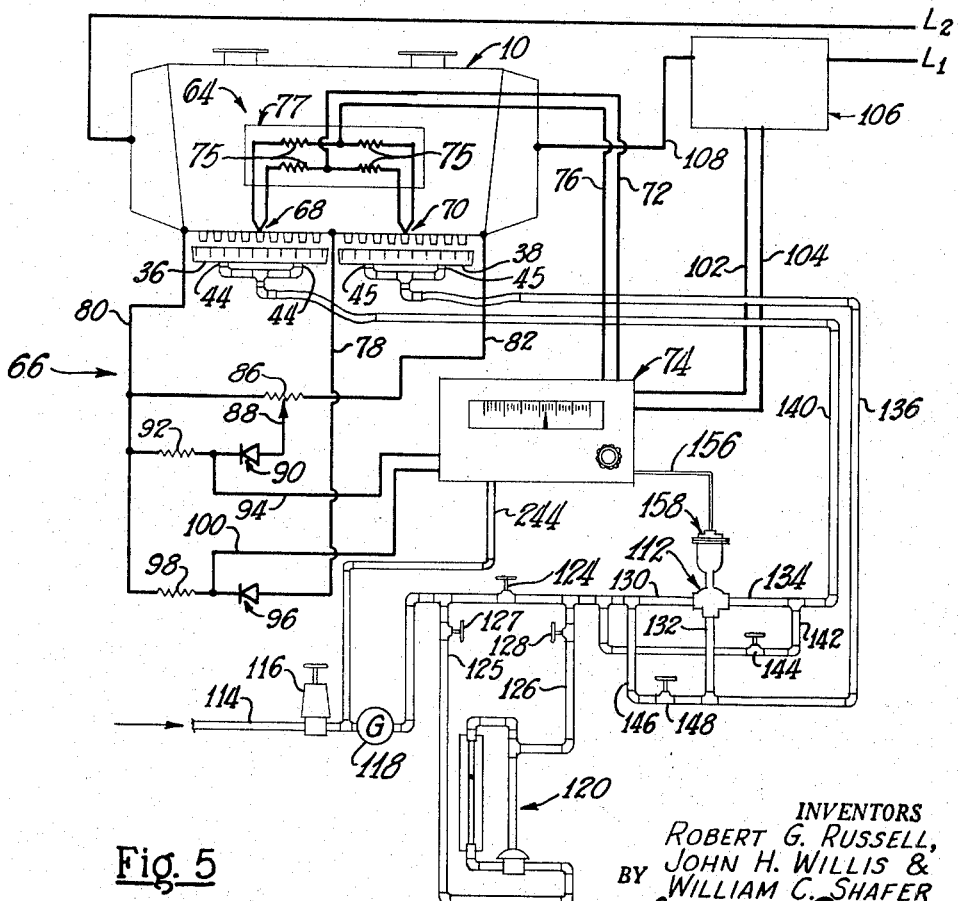
FIGURE 5 is a schematic view illustrating the electric control circuitry and the gas conveying system of the invention for a stream feeder.

With particular reference to FIGURE 5, two control circuits are assosicated with the feeder 10, one circuit 64 being an averaging circuit for maintenance of stream feeder temperature, the other circuit 66 being a balanced resistance bridge circuit for controlling air flow to the environments of the groups of streams.

Each circuit is, in effect, a balanced resistance or bridge. The circuit 64 is inclusive of resistance legs for indicating electrical imbalance set up by temperature variations in two halves of the bushing or feeder 10.

This circuit arrangement is such that when the average temperature of the two halves of the stream feeder are equal, the bridge or resistance system is balanced and the voltage output is zero.

Any unbalance or variation in temperature between the halves of the bushing in either direction sets up an imbalance in the bridge circuit, the amplitude of the voltage being proportional to the temperature imbalance. The arrangement includes a current control for the feeder responsive to the voltage set up by temperature imbalance conditions for restoring proper temperatures in the feeder or bushing. The circuit 66 includes an automatic controller for proportioning, regulating or varying the delivery of air or other gas through the porous fin sections to secure uniformity of streams of glass from the feeder.

The circuit 64 for establishing temperature control of the feeder or bushing is inclusive of two thermocouples, one thermocouple 68 being arranged in the bushing at a region midway between the center of the bushing and the left-hand end, as viewed in FIGURE 5, the other thermocouple 70 being disposed midway between the center of the bushing and the right-hand end thereof. The pair of thermocouples are connected to a controller 74 of conventional character by conductors 72 and 76. Conventional balancing resistors 75 contained in a housing 77 are intercalated in the thermocouple circuit for initial circuit balancing purposes.

The output of the resistance bridge circuit 64, which is dependent upon temperature variations lengthwise of the feeder, is utilized to regulate or control electric current flow to maintain the feeder at a desired average temperature. The controller 74, as shown in FIGURE 5, includes a temperature regulating unit 101 connected with the conductors 72 and 76 with the thermocouples 68 and 70, the output of the temperature regulating unit 101 being conveyed to a saturable core reactor 106 through the conductors 102 and 104. A control circuit of this character, including a temperature regulating unit and saturable core reactor, may be of the character shown in Roberson Patent 3,126,268. Through such arrangement, voltage set up by temperature variations between the thermocouples 68 and 70 sets up a voltage which is transmitted through the regulating unit 101 to the saturable core reactor 106 to increase or decrease the current flow to the feeder for maintaining the feeder at a proper temperature.

The bridge circuit 66 is adapted, through a controller 74, to actuate a three-way diverting or apportioning valve 112 actuated by a conventional pneumatically controlled diaphragm motor 158, this arrangement accurately proportioning and controlling air flow to the manifolds 36 and 38 for the groups of glass streams flowing from the two halves of the feeder 10. Any unbalance in resistance in the silicon diode circuits produces a voltage output to the controller 74, variations in resistance due to differentials in temperature between the two halves of the bushing or feeder resulting in a positive or negative potential conducted to the controller 74 and therein translated to a pneumatic output for the diaphragm motor 158 to reset or control the position of a movable member of the apportioning valve 112.

The balancing or bridge circuit 66 includes a conductor 78 connected with the floor of the feeder 10 midway between its ends, and conductors 80 and 82 connected with the respective ends of the feeder floor. The conductors 80 and 82 are connected with a potentiometer 86, the adjustable arm 88 of the potentiometer being connected with a silicon diode 90 or other suitable detector component, a resistance 92 being arranged between the silicon diode 90 and the conductor 80. The diode is connected with the controller 74 by a lead 94.

The conductor 78, connected at the mid region of the feeder or bushing 10, is connected with a second silicon diode 96, a resistance 98 being connected between the conductor 80 and the silicon diode 96. The output of the silicon diode is connected to the controller by a lead 100. The diodes are unidirectional, one being responsive to positive voltage and the other to negative voltage, being the output fed to the controller 74.

If one feeder section or region is at a higher temperature, the output voltage will be positive and, if the other section or region of the bushing is at a higher temperature, the output voltage will be negative. By operating at zero voltage output as a base factor, the magnitude of the feeder voltage, which is used to excite the bridge circuit, does not appreciably affect the operation as a change or variation in bushing voltage due to temperature control or regulatory action will not cause a shift in the set point.

The controller 74 is of conventional construction such as a millivolt potentiometer controller embodying an arrangement for translating voltage to a pneumatic output for actuating the diaphragm motor 158 for setting the valve member of the apportioning valve 112. The controller 74 is preferably a control instrument known as an "Electronik 15," made by the Minneapolis-Honeywell Regulator Company. The controller 74 will be hereinafter described.

The fluid flow or piping system for conveying air or other gas under pressure to the manifold and porous fin sections 36 and 38 includes a supply pipe 114 which is connected with a supply of compressed air or an air pump. A pressure reducer or regulator 116 is provided in the line 114 to reduce the air pressure to a value commensurate with the volume of air required for the porous fins per unit of time. The air conveying system includes a gauge 118 for indicating the pressure in the system. A flowmeter 120 is illustrated for the purpose of indicating the flow rate of air in cubic feet per minute being delivered to the porous fin sections.

A valve 124 is provided in the air line for by-passing the flowmeter, if desired. Branch lines 125 and 126 are interposed between the flowmeter 120 and the air supply line, these branch lines being respectively provided with cut-off valves 127 and 128 which may be closed to facilitate removal of the flowmeter 120 without impairing air flow in the system. The automatically controlled three-way diaphragm valve 112 is connected with three air conveying pipes respectively designated 130, 132 and 134, the pipe 130 being connected with the supply line 114.

The pipe 132 is connected with a pipe 136 for conveying air to the manifold fin section 38. The pipe 134 is connected with a pipe 140 for conveying air to the manifold fin section 36. A by-pass 142 is provided conveying air around the diverting valve 112, a manually controlled regulating valve 144 being intercalated in the by-pass line 142. A by-pass 146 is arranged between the pipes 130 and 132, the by-pass 146 being provided with a manually controlled regulating valve 148.

The pneumatic diaphragm motor-actuated diverting or apportioning valve unit 112 is of conventional construction such as Minneapolis-Honeywell Type 16, manufactured by Minneapolis-Honeywell Regulator Company, the valve 112 being hereinafter described. The valve 112 is controllable to positions to establish communication between pipe 130 and pipes 132 and 134 whereby the relative position of the valve member in the valve construction 112 proportions or regulates a fraction of the total quantity of air delivered to the respective porous shield sections.

The valve unit 112 is adapted to divert or proportion a percentage of the total air delivered to the fin manifold sections 36 and 38, the valve unit providing a supplemental means for apportioning air flow to the manifold fin or shield sections in addition to the air flowing through the by-pass arrangements which embody the control valves 144 and 148. The manually controlled valves 144 and 148 are adjusted to direct and regulate air flow to the sections individually of one another whereby a substantial amount of the air delivered to the manifold fin sections traverses the two by-pass channels around the valve 112.

The valve unit 112 is inclusive of a housing 170 of cast metal construction having a central web 172 and a second web 173, the webs being provided with aligned bores which slidably yet snugly accommodate a cylindrically shaped valve member or plug 174. The web constructions interiorly of the housing provide an air inlet port or channel 176 in communication with the air supply pipe 130, a second port or channel 178 being an outlet port in communication with the pipe 132, and a third port or channel 180 providing the second outlet which is in communication with the pipe 134. The valve member or plug 174 is fashioned with a central imperforate portion 182 to which is secured a rod or shaft 184. The regions of the plug or slidable valve 174 either side of the central portion 182 are of skirt formation, the upper skirt being provided with circumferentially spaced slots 186 and the lower skirted portion provided with circumferentially spaced slots 188.

Figure 6:
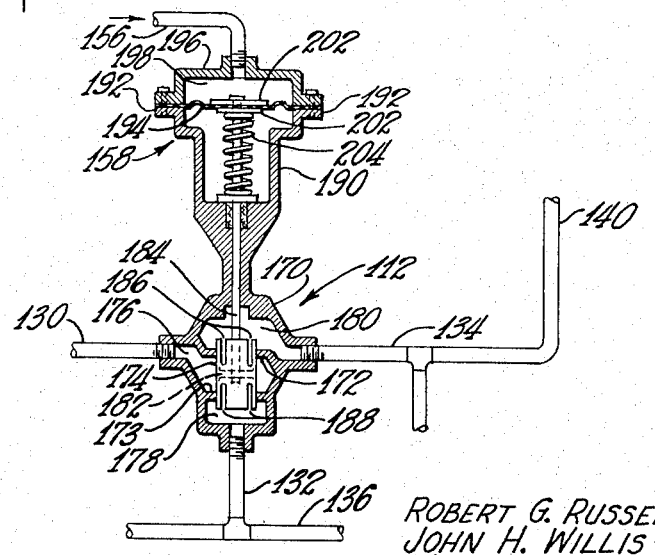
FIGURE 6 is a sectional view of an air apportioning means and actuator therefor.

It will be apparent from FIGURE 6 that the relative position of the plug or valve 174 with respect to the channels or outlet ports 178 and 180, determines the distribution of air from the inlet channel 176 in proportioned amounts through the outlet ports 178 and 180, it being understood that the total amount of air delivered through the pipes 132 and 134 is the amount of air entering the inlet channel 176 of the valve unit 112. Thus, while more air may be delivered through one outlet pipe than the other to the respective groups of fins 36 and 38, the total amount of air flowing through the valve unit 112 remains constant.

The pneumatic actuated diaphragm motor 158 actuates or controls the relative position of the slidable valve member or plug 174. The valve casing 170 has a tubular extension 190 terminating in a circular flange 192. A diaphragm 194 of flexible material has its peripheral region seated on the flange 192. A cover member 196 has a peripheral flange seating on the peripheral region of the diaphragm 194, the cover 196 and flange 192 being secured together providing a tight seal with the diaphragm and an unvented air chamber 198. The cover 196 is provided with an air conveying tube or pipe 156.

The diaphragm is reinforced by metal discs 202 disposed at opposite sides thereof. The rod 184 carrying the valve member 174 has its upper end secured to the discs 202 to establish operative connection between the diaphragm and the rod. An expansive coil spring 204 normally biases the diaphragm 194 to an uppermost position when atmospheric pressure obtains within the diaphragm chamber 198.

The diaphragm 194 and hence the relative position of the valve member or plug 174 is determined by pneumatic output from the controller 74. The instrumentation of the controller 74 is illustrated semi-schematically in FIGURE 7, the instrumentation translating a voltage output from the bridge circuit 66 to a pneumatic output for actuating the diaphragm 194. The controller 74 is inclusive of a potentiometer circuit connected with a continuous balance system or unit in which a voltage from conductor 94 or conductor 100 sets up an unbalance condition which is amplified, the amplified output operating a balancing motor which converts the electrical unbalance into mechanical motion.

Figure 7:
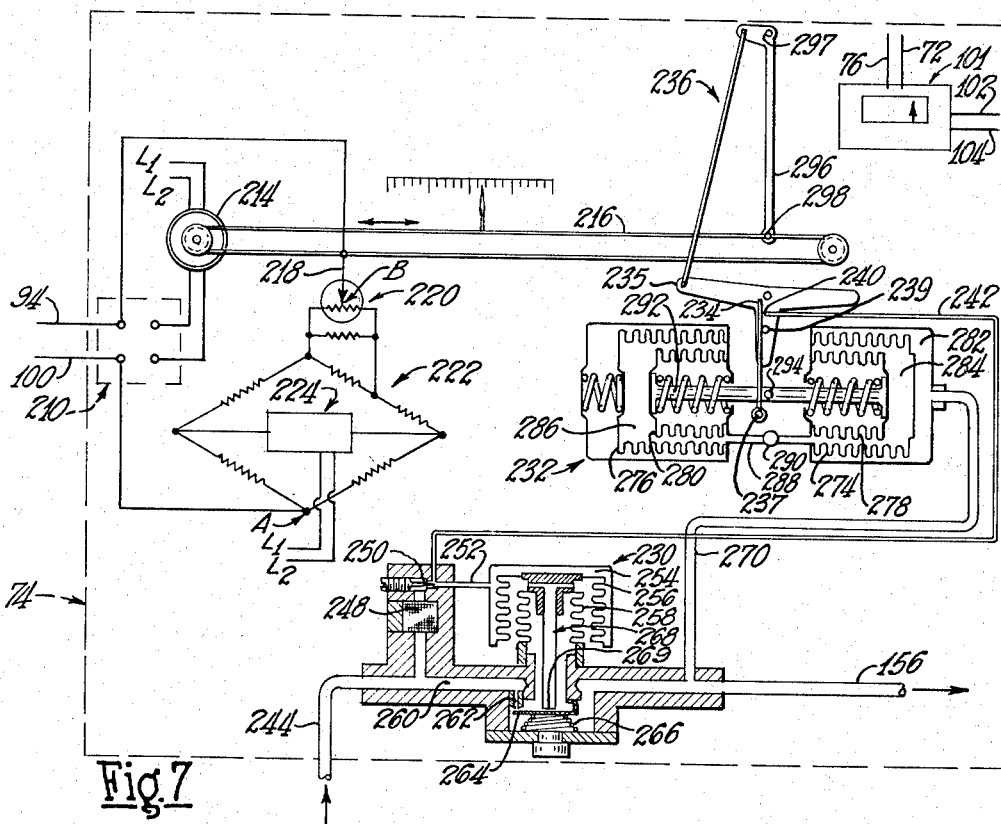
FIGURE 7 is a semi-schematic view of control components for the air apportioning means.

The continuous balance unit is a standard product of Minneapolis-Honeywell Regulator Company and comprises a converter, input transformer, voltage amplifier and power amplifier. In FIGURE 7, the constant balance unit 210 receives a voltage output through conductor 94 or conductor 100 depending upon a differential in temperature of one-half of the bushing compared with the other half. This voltage fed to the continuous balance unit 210 is converted therein as an AC voltage which is amplified in the unit. The amplified output from the unit 210 operates a balancing motor 214, which is a reversible, variable speed induction motor.

One winding of the motor is continuously energized by line voltage L1, L2, and the other winding energized by the output from the continuous balance unit 210.

The motor 214 drives a wire cable 216 which drives a slidewire contactor 218 of a potentiometer 220 to a position where the difference in voltage in the measuring circuit is reduced to zero between point A and point B of the bridge circuit, in which condition the motor 214 ceases rotation. The resistance bridge system 222 in circuit with the potentiometer 220 receives a constant regulated voltage from a Zener diode constant voltage unit 224 which operates from line voltage input.

The controller 74 includes a pneumatic means set into operation by means actuated by movement of the cable 216 for adjusting the position of the diaphragm 194 to effect a positioning of the apportioning valve 174 through pressure change in the chamber 198 above the diaphragm. The pneumatic system includes a pilot valve 230 and a liquid-filled bellows system or unit 232 equipped with a movable flapper or air control member 234, the latter being relatively movable through the provision of linkage 236 operated by movement of the cable 216 driven by the motor 214.

An end of the flapper 234 is fulcrumed as at 237. Associated with the flapper is an air nozzle 240, being the outlet orifice of an air tube 242 connected with the pilot valve 230. The nozzle 240 is comparatively small and the air pressure in tube 242 comparatively low, air being delivered from the nozzle 240 to the atmosphere except as restricted by the position of the flapper member or valve 234. The pilot valve is of the nonbleed type and is connected with a supply of air under pressure by a tube or pipe 244 which is connected with an air conveying pipe 114, as shown in FIGURE 5.

Air is conveyed from the pipe 244 through an air filter 248 through a restriction or metering passage 250 to the tube 242 and through a tube 252 into a cylindrically shaped chamber 254 of the pilot valve construction. The pilot valve is inclusive of a first bellows 256 and a second smaller bellows 258, the chamber 254 being a closed chamber. Air from the tube 244 flows through a passage 260 to a port 262 normally closed by a flapper valve 264 which is biased to closed position by a spring 266.

The double bellows arrangement in the chamber 254 is equipped with a tube or strut 268 which controls the action of the flapper 264. The strut is tubular throughout a portion of its length providing an exhaust port 269, the upper end of the tubular portion of the strut being open to the atmosphere in the region between the bellows 256 and 258. The flapper 264 normally closes the exhaust port 269. The flapper 264 controls air flow through a pipe 270 to the liquid-filled bellows system 232 and through a pipe 156 to the diaphragm motor chamber 198.

The liquid-filled double bellows system includes two outer bellows members 274, 276 and two inner bellows members 278 and 280. The chamber 282 is an air chamber connected with the pipe 270. The spaces 284 and 286 between the respective large and small bellows are filled with liquid which are interconnected by a passage 288, the liquid flow rate from one bellows to another being controlled by an adjustable needle valve 290.

The small bellows members 278 and 280 are connected together by a connecting rod 292 having an abutment 294 engageable, under certain conditions, with the flapper valve 234. A link 235 is equipped with a pin 239 whereby movement of the linkage 236 by the cable 216 modifies the position of the flapper valve 234 with respect to the nozzle 240. The flapper valve 234 is in the form of a flexible reed of thin metal and is normally stressed in a direction toward the nozzle 240. The linkage system 236 includes a link 296 pivoted as at 297 and connected to the cable 216 as at 298. Through the linkage arrangement, a substantial travel of the cable 216 results in a very small movement or flexure of the flapper valve 234.

The function of the valve 112 is to apportion the air entering the port 176 from the pipe 130 between the conduits or pipes 136 and 140 leading to the respective manifold fin sections depending upon the magnitude of voltage output to the continuous balance unit 210 of the controller 74 by a temperature differential between the two sections of the stream feeder and the direction of voltage output, viz. whether positive or negative to influence the pneumatic system to change the relative position of the apportioning valve 174 whereby the fin section adjacent the feeder section at highest temperature receives a proportionate increase in the amount of air and the air flow to the other section reduced in a like amount, yet maintaining constant the combined air flow to both manifold fin sections. Under normal operating conditions the valve member or plug 174 is positioned by the diaphragm 194 so that the air entering the inlet 176 is substantially evenly divided between the outlet ports 178 and 180.

In operation, assuming the temperature of the left-half of the feeder 10, as viewed in FIGURE 5, adjacent the porous fin section 36 increases, the bridge circuit 66 will become unbalanced and an output voltage is fed through conductor 100 to the continuous balance unit 210, creating an unbalance between points A and B of the potentiometer circuit. The voltage unbalances the unit 210 and the output of the unit causes rotation of the motor 214, driving the cable 216 in a direction actuating the linkage 236 to rotate member 235 in a counterclockwise direction moving the abutment 239 slightly away from the flapper 234 which, being inherently stressed or flexed toward the nozzle 240, moves closer to the nozzle.

By reason of the restriction 250 at the entrance of the pipe 242, pressure builds upon rapidly between the nozzle 240 and the restriction 250 when air delivery through the nozzle is reduced by movement of the flapper valve member 234 closer to the nozzle. Simultaneously with movement of the linkage 236, the cable 216 moves the slide contactor 218 of the potentiometer 220 to a position balancing the input voltage through the conductor 100 to the unit 210. When this balanced condition is attained, motor 214 ceases rotation and, through the linkage 236, limits the movement of the abutment 239 in a counterclockwise direction and thereby limits further movement of the flapper member 234 toward the nozzle.

The resulting increase in nozzle pressure is amplified through the nonbleed pilot valve 230 and air pressure builds up in chamber 198 against the diaphragm 194 moving the valve member or plug 174 downwardly as viewed in FIGURE 6. As will be apparent from FIGURE 6, downward movement of the valve member 174 reduces air delivered through the slots 188 to the port 178 and pipe 136 to reduce the amount of air delivered to the manifold 38, while the amount of air flowing through slots 186 into the port 180 and pipes 134 and 140 increases to the manifold 36 to provide additional cooling for the glass streams flowing from the left half of the stream feeder 10. While the position of the plug or valve member 174 thus apportions the air entering the inlet port 176 between the outlet ports 178 and 180, the total amount of air delivered to the two manifolds remains substantially constant.

Upon increase in air pressure in the diaphragm chamber 198, such increase is simultaneously transmitted through pipe 270 to the chamber 282 in the region of the right-hand bellows 274. The resultant movement of the bellows 274 is hydraulically transmitted to the two inner bellows members 278 and 280 which are mechanically joined by the connecting rod 292. Under the influence of increase air pressure in chamber 282 against bellows 274, the connecting rod 292 is moved to the left and carries the flapper member 234 away from the nozzle 240 just enough to stabilize the pressure at the new value and maintain the diaphragm actuated valve 174 in its new position.

This action produces a definite controlled valve position. The two small inner bellows members 278 and 280 are spring loaded and will return to their normal positions when the liquid pressure on the right-hand bellows 274 has been equalized with the pressure on the left-hand bellows by flow of liquid through the passage 288 into the bellows 276.

When the thermal balance of the left half of the feeder 10 returns to normal, the voltage in conductors 94 and 100 becomes balanced which renders the potentiometer circuit, that is, the voltage between points A and B unbalanced, the motor 214 then rotating in the opposite direction to move the poteniometer contactor 218 to equalize the voltage in the poteniometer circuit and in the continuous balance unit 210, the linkage 236 being moved by the cable 216, restores the flapper member 234 to its normal position at an increased distance away from the nozzle 240.

Movement of the valve member 234 away from the nozzle causes air pressure to be reduced in the chamber 198 on the diaphragm to a new value, the spring 204 moving the valve member 174 back to its mid position whereby flow of air entering the port 176 in the valve 112 is substantially equally divided or apportioned between the outlet ports 178 and 180 and hence an equal amount of air delivered to each manifold 36 and 38. Through this arrangement, an unbalance in temperature between one-half of the feeder and the other apportions the air delivered through pipe 130 between the respective manifolds to provide an increased amount of air delivered into the regions of the glass streams from the half of the feeder at the highest temperature.

From the foregoing it will be apparent that the temperature balance is controlled automatically and air distribution to the porous fin sections is accomplished automatically. When the control is set for normal yield of yardage of filaments from the feeder, the automatic balance control will compensate for the shifting heat patterns that may develop in the feeder or bushing.

While the arrangement illustrated includes a flowmeter 120, it is to be understood that the flowmeter may be removed by closing the valves 127 and 128 controlling the air lines to the flowmeter and opening the valve 124 so that air from the compressed air supply may flow directly to the pipe sections 130, 142 and 146. One flowmeter may be employed as an air flow indicating means for use with several feeder and fin constructions. The porous air fin is self-cleaning by reason of the continuously moving air stream. While compressed air properly filtered is preferably employed for delivery through the porous shield members, other gases such as nitrogen, argon, krypton or steam may be employed for cooling the hot cones of glass at the region of the porous fins. Through the improved stability of the ambient temperature at the groups of streams, more stable operation is attained and hence the attenuated filaments are of more uniform size. Such arrangement may also be used with a feeder or bushing having a single group of orificed projections for the delivery of streams of glass to form a single strand by utilizing two groups of fins with a single feeder in the same manner as illustrated in FIGURE 5 wherein the filaments form a single strand which is wound upon a single sleeve on a winder of the type shown in FIGURE 1. The porous fin structure 42 may be a very fine mesh stainless steel screen although other suitable materials may be employed for the purpose.

While the air diverting or apportioning valve unit 112 is illustrated as arranged to control the flow of a portion of the air supplied to the manifold and fin sections, the valve may be of a size to regulate or apportion all of the air supplied to the manifolds and groups of porous shields. In such arrangement the use of the by-pass pipes 142 and 146 and air valves 144 and 148 is unnecessary.

It is apparent that, within the scope of the invention, modifications and different arrangements may be made other than as herein disclosed, and the present disclosure is illustrative merely, the invention comprehending all variations thereof.

We claim:

1. The method of controlling the viscosity characteristics of groups of streams of heat-softened glass delivered from adjacent sections of a stream feeder, establishing a balancing circuit wherein the sections of the stream feeder constitute resistances in the circuit, continuously delivering gas into the environment adjacent and into contact with the streams of each group, and automatically proportioning the delivery of gas adjacent the respective groups of streams responsive to an unbalance condition in the circuit due to the changes in resistance of the sections caused by thermal variations of the sections whereby to convey sufficient heat away from the glass streams of each group to maintain substantially constant the viscosity of all of the streams.

2. The method of controlling the flow characteristics of streams of heat-softened glass including flowing two groups of streams from adjacent sections of a stream feeder, continuously delivering gas adjacent each of the groups of streams and into contact with the streams to convey heat away from the streams of each group, and automatically apportioning the rate of delivery of gas to each of the groups of streams responsive to temperature differentials of the sections of the stream feeder while maintaining substantially constant the combined amount of gas delivered adjacent both groups of streams whereby to convey sufficient heat away from the glass streams of each group to maintain substantially constant the viscosity of all of the streams.

3. The method of controlling the flow characteristics of streams of heat-softened glass including flowing two groups of the streams from adjacent orificed sections of a stream feeder, continuously delivering heat transfer fluid from zones adjacent and individual to each of the groups of streams into direct contact with the streams, conveying heat away from the streams of the groups by the heat transfer fluid, and proportioning the delivery rate of fluid from each of the zones responsive to temperature differentials of the feeder sections while maintaining substantially constant the total amount of fluid delivered from the zones whereby to convey sufficient heat from the glass streams of each group to maintain a substantially uniform viscosity of all of the streams.

4. The method of controlling the flow characteristics of groups of streams of heat-softened glass including flowing two groups of streams from different areas of a feeder, averaging the temperature of the glass throughout the feeder, automatically maintaining the temperature of the glass in the feeder at the average temperature, continuously delivering fluid from zones adjacent and individual to each of the groups of streams into direct contact with the streams, conveying heat away from the streams of the groups by the fluid, and automatically proportioning the delivery rate of fluid from each of the zones responsive to temperature differentials between the areas of the feeder from which the groups of streams are delivered whereby to convey sufficient heat from the glass streams of each group to maintain a substantially uniform viscosity of all of the streams.

5. The method of controlling the flow characteristics of groups of streams of heat-softened glass including flowing two groups of streams from different areas of a feeder, averaging the temperature of the glass throughout the feeder, automatically maintaining the temperature of the glass in the feeder at the average temperature, continuously delivering air from zones adjacent and individual to each of the groups of streams into direct contact with the streams, conveying heat away from the streams of the groups by the air, automatically proportioning the delivery rate of air from each of the zones responsive to temperature differentials between the areas of the feeder from which the groups of streams are delivered whereby to convey sufficient heat from the glass streams of each group to maintain a substantially uniform viscosity of all of the streams, and maintaining substantially constant the total amount of gas delivered from both zones.

References Cited
UNITED STATES PATENTS 3,002,226  10/1961  Warthen _____ 65—1 X
3,256,078  6/1966  Drumman _____ 65—12 X DONALL H. SYLVESTER, *Primary Examiner.*

F. W. MIGA, *Assistant Examiner.*